US008630018B2

(12) United States Patent
Duss

(10) Patent No.: US 8,630,018 B2
(45) Date of Patent: Jan. 14, 2014

(54) PRODUCING PRINTED PRODUCTS AND ASSEMBLY FOR CARRYING OUT SAID METHOD

(75) Inventor: Hanspeter Duss, Olten (CH)

(73) Assignee: Mueller Martini Holding AG, Hergiswil, Hergiswil (CH)

( * ) Notice: Subject to any disclaimer, the term of this patent is extended or adjusted under 35 U.S.C. 154(b) by 1140 days.

(21) Appl. No.: 12/276,258

(22) Filed: Nov. 21, 2008

(65) Prior Publication Data

US 2009/0147303 A1 Jun. 11, 2009

(30) Foreign Application Priority Data

Nov. 23, 2007 (EP) .......................... 10 2006 023 964
Nov. 23, 2007 (EP) .................................... 07022796

(51) Int. Cl.
*G06F 15/00* (2006.01)
*G06K 1/00* (2006.01)
*G06K 15/00* (2006.01)
*G06F 3/12* (2006.01)

(52) U.S. Cl.
USPC ........................... 358/1.9; 358/1.15; 358/1.18

(58) Field of Classification Search
None
See application file for complete search history.

(56) References Cited

U.S. PATENT DOCUMENTS 5,730,299 A 3/1998 Helsley
6,592,113 B1 * 7/2003 Asao .......................... 270/58.07
6,959,121 B2 * 10/2005 Kumazawa .................. 382/294
2003/0139845 A1 7/2003 Graushar
2003/0196175 A1 * 10/2003 Shea ............................ 715/526
2005/0270566 A1 * 12/2005 Tanaka ......................... 358/1.15
2006/0202403 A1 * 9/2006 Nagata et al. ............. 270/58.11

FOREIGN PATENT DOCUMENTS

DE 2253598 A1 5/1973
DE 19512501 A1 10/1996
DE 102004038284 A1 2/2006
DE 102005009301 A1 9/2006
DE 102007047609 A1 4/2009
EP 0685420 A1 12/1995
EP 0700853 A1 3/1996
EP 1216947 A1 6/2002
EP 1349108 A1 10/2003
EP 1911583 A1 4/2008
EP WO2008043194 A2 4/2008
JP 2007-123990 * 5/2007 .............. H04N 1/21
WO WO2004060692 A1 7/2004
WO 2004073999 A1 9/2004

* cited by examiner

*Primary Examiner* — Ming Hon
(74) *Attorney, Agent, or Firm* — Schwabe, Williamson & Wyatt, P.C.

(57) ABSTRACT

The method for producing printed products in which said printed products are composed of printed sheets and for verification of the composition, composition information on at least one printed sheet characterizing said printed sheet with respect to predetermined printed sheet properties is evaluated, whereby during analysis, the composition information of at least one printed sheet is compared to the information of at least one more printed sheet to be assembled using said composition information for production of the same printed product.

16 Claims, 7 Drawing Sheets

PRODUCING PRINTED PRODUCTS AND ASSEMBLY FOR CARRYING OUT SAID METHOD

CROSS-REFERENCE TO RELATED APPLICATIONS

The present application claims international priority under 35 U.S.C. §119 to co-pending European Patent Application No. EP 07022796.2 filed 23 Nov. 2007, entitled "Verfahren zum Herstellen von Druckprodukten und Vorrichtung zur Ausführung derartiger Verfahren," the entire content and disclosure of which is hereby incorporated by reference in its entirety.

TECHNICAL FIELD

The invention relates to a method for producing printed products in which said printed products are composed of printed sheets and for verification of the composition, composition information on at least one printed sheet characterizing said printed sheet with respect to predetermined printed sheet properties is analyzed, and an assembly for carrying out said methods with a plurality of feeding devices designed for feeding said printed products to a working station, where at least two feeding devices are assigned one registration device for registering the composition information of the printed sheets to be fed with said feeding device and a inspective device designed for analyzing said composition information registered by said registration device.

BACKGROUND

When producing printed products, two, three or more printed sheets, each of which may feature one, two or more sheets of the finished printed product are gathered at a working station and then, as appropriate, are directed for further processing. For this purpose, so-called gathering machines may be used in which the printed sheets with the aid of feeding devices in form of sheet feeders are taken from a stack of, as appropriate, folded printed sheets and deposited on a conveyor chain. Said conveyor chain in said devices is formed by a plurality of working stations which are aligned consecutively and move along a predetermined working path, whereby the printed sheets, deposited typically opened with a trailing fold and laid astride on said working stations formed by the consecutive sections of the conveyor chain, may be transported along the working path with the aid of suitable grippers and may be held at said working station.

Said gathering machines are described, for example, in EP 1 216 947 Al. The disclosure of this publication with respect to design and operation of said gathering machines is hereby included explicitly by reference.

When producing printed products from individual printed sheets it is essential, that the printed sheets of each printed product are directed to the working station in a predetermined direction and according to a predetermined sequence. In gathering machines described in EP 1 216 947 Al, the composition of each printed sheet of a given printed products is verified, by reading the information embedded in each printed sheet and characterizing each printed sheet with a suitable reading device, feeding to an inspective device and comparing to topology data of the printed product to be produced from the printed sheets, stored in said inspective device. When, by comparison of the read information and the topology data, a discrepancy is detected, the production process may be interrupted and/or the faulty printed sheet may be removed.

When carrying out said methods, it has been shown that the production of various printed products, which may contain printed sheets containing the same information, can be problematic.

When faced with these problems of the state of the art, the invention relates to a method with which the production of various printed products may be controlled simply and reliably.

According to the present invention, this may be accomplished by extension of previously known methods, characterized essentially in that during analysis, the composition information of at least one printed sheet is compared to the information derived of at least one more printed sheet used for production of the same printed product, in particular composition information.

The present invention acknowledges that for reliable testing of the composition of printed products it is not necessary to compare the composition information of all printed sheets to a data set of the entire printed product, but it is sufficient to verify that the individual printed sheets which are fed sequentially to the working station are compatible with each other. With said method, through appropriate selection of composition information, a printed sheet containing composition information may be assigned to different printed products, if only care is taken that the composition information of the other printed sheets of said printed product show a direct or indirect connection with said printed sheet. Embodiments of the present invention include in particular methods where only individual printed sheets contain composition information, the information content of which indicates, that other printed sheets do not contain the respective composition information. Of said printed sheets, information can be derived, that they do not contain separate composition information, and during analysis this information may be compared to the composition information provided on one or more of the remaining printed sheets of the printed product.

Embodiments of the present invention include methods where expediently an error signal is generated, when the result of the evaluation determined a faulty composition of the printed product. In response to the error signal, the device used for execution of said method, such as, for example, a gathering machine may be stopped and/or the faulty printed product may be removed.

As mentioned above in connection with conventional gathering machines, the printed sheets for producing printed products are typically transported sequentially to a working station. In this process, the composition information of at least one fed printed sheet may contain position information describing a printed sheet to be fed to said working station immediately before and/or afterwards, wherein during the analysis the position information of at least two printed sheets to be fed sequentially to said working station is compared to each other. The position information of the printed sheets constitutes a general description of all permissible sequences of printed products. Hereby, the position information may consist of two partial informations, the first one describing one or more printed sheets which, before feeding said sheet, are to be fed to the working station, whereas the second partial information may describe one, two or more printed sheets to be fed to said working station afterwards. Within the scope of the present invention it is also thought to include in the position information, the information that preceding or following said printed sheet there is no further printed sheet to be fed.

Besides said position information, the composition information may also contain product information indicating that a printed sheet is part of one or more printed products, and an error signal is generated when the analysis of the product information of two printed sheets to be assembled to one printed product show that the printed sheets may not be assembled to one printed product. Hereby said product information may contain two or more partial informations. In this context, it may also be thought of that individual products are part of, for example, a product group of a common order and one of the partial informations designates said product group. A second partial information may indicate that the designated printed sheet is part of a certain printed product of the product group. Thus, said information designates those printed products which are permitted to contain the respective printed sheet. If a product can be part of several products, it may be designated with special value (joker) of the partial information. This may be realized, for example, by the product information designating only a product group rather than a specific product. Furthermore, it is also thought of a partial information of the product information that represents that the designated printed sheet is only optional for the respective printed product and, if appropriate, may be replaced with a printed sheet with otherwise identical composition information.

To designate that printed sheets are part of groups of printed products, the product information, as described above, may contain partial information that designates said being part of this group. The designation of overriding groups basically may be extended indefinitely.

Within the scope of the present invention, it is also thought to include the execution of such methods in which the composition information of at least one printed sheet is compared only during production of the first printed product of a series of identical products to the information derived from at least one more printed sheet designated for production of said printed products. In this case, the method according to the present invention is only executed during set-up of the machine used for production of the printed products. In principle, with one machine set-up, only identical products may be produced with said methods. According to an embodiment of the present invention, when producing printed products in connection with the production of the first product of a series of identical products, the composition information of at least one printed sheet is compared to the composition information of the corresponding printed sheet used for the first product of the product series and an error signal is generated if the composition information of the printed sheet to be used for the production of the subsequent printed products differs from the composition information of the printed sheet used for production of the first printed product.

In another embodiment of the present invention, during production of each printed product of a series of identical products, the composition information of at least one printed sheet is compared to information derived from at least one more printed sheet used for production of said printed products. In said embodiment of said method of the present invention, printed products with differing printed sheet composition may be produced in one production cycle. When different printed products are produced as part of a product series, it may also be determined during analysis of the composition information whether the composition of individual printed sheets will lead to conforming printed products as designated by the composition information.

As described above in connection with conventional methods, the working station, for example, realized in form of a section of a conveyor chain, may be moving during the assembly of printed products along a production path, and the working station may be fed with the printed sheets necessary for production of the printed product with feeding devices arranged alongside the production path. Within the scope of the present invention, it is also thought of, as described above, feeding printed sheets for two or more printed products with one feeding device. In this case, it is advantageous when the composition information of the corresponding printed sheets is compared during production of each printed product to the information derived from at least one more printed sheet designated for production of said printed product. In any case, when executing said methods, it is useful to consider additional position information with respect to the position of the corresponding feeding device relative to the production path during analysis of the composition information. Said position information, together with the composition information may be transferred to a inspective device and/or may be stored in said inspective device and may be designated to said composition information.

Typically, it is also verified, if printed products fed by the feeding device are identical and an error signal is generated then, when composition information of a printed sheet is different from the composition information of the remaining printed sheets fed with said feeding device. If printed sheets for two or more printed products are to be fed with one feeding device, a corresponding check, without negatively impacting the reliability of the process, may take place when the composition information of the printed sheets at the feeding device designed for feeding printed sheets of two or more printed products contains a partial information, representing that it is permitted to feed printed sheets with different composition information at the corresponding feeding device. After analysis of said partial information, the generation of an error signal is prevented, when printed sheets containing different composition information are fed by said feeding device.

The above information represents additional information, which is neither associated with the product information nor the position information. Said additional information may be contained in various ways in the composition information. In this context, it is referred to, among others, to the following additional information:

1. In a printed product, a printed sheet shall be present sequentially multiple times.
2. A printed sheet is part of a “Coming and Going product”.
3. A printed sheet may also be inserted twisted by 180°.

The present invention concerns also a variable production where during composition of the printed products at least one printed sheet is selected depending on the analysis of the composition information of at least one other printed sheet. In this context, the present invention also concerns, for example, aborting individual feeding devices, if the composition information of a printed sheet shows, that there is no printed sheet to be fed to said feeding device.

As already explained above, the composition information of a printed sheet may include a beginning and an ending information which represents that for assembly of a printed sheet before or after feeding said printed sheet to a working station, there is no further printed sheet to be fed to said working station, whereby an error signal is generated when a printed sheet is fed to feeding device along the production path serving to feed printed sheets containing the beginning and ending information.

Although the composition information may be captured also before or after feeding the printed sheets, it proved itself particular expedient within the scope of the present invention if at least at one feeding device the composition information provided by the printed sheet to be fed with said feeding device is captured and, as appropriate, is passed on, to a control device together with the position information representing the position of said feeding device with respect to the production path and/or with respect to other feeding devices.

Hereby, said composition information may be coded according to a predetermined encoding method, for example, as a bar code, whereby decoding may take place in said inspective device. In order to increase the flexibility of methods according to the present invention, it proved to be expedient, when the composition information contains partial information representing or presenting said coding method and the control device executes the decoding according to said partial information. As already explained above, printed sheets without composition information may be fed for assembly of the printed product, their feeding being pointed out by composition information embedded in at least one printed sheet.

As shown by the above description of methods according to the present invention, a suitable device for performing said methods is characterized by a plurality of feeding devices or feeders for feeding printed sheets to a working station, whereby at least two feeding devices are designated a capturing device suitable for capturing composition information embedded in printed sheets to be fed by said devices and a control device designed to analyze composition information captured by said capturing device, mainly by the control device being able to compare composition information captured by at least two capturing devices. Hereby, working stations according to the inventive device may be realized, just like in conventional gathering machines, as individual sections of a conveyor chain, whereas the feeding devices may be realized as conventional printed sheet feeders and the capturing device may feature a bar code reader.

BRIEF DESCRIPTION OF THE DRAWINGS

Below, the invention is illustrated with respect to the drawing, which is alluded to with respect to all details related to the present invention and not specifically emphasized in the description. In the drawing.

DETAILED DESCRIPTION OF EMBODIMENTS OF THE INVENTION

Figure 1:
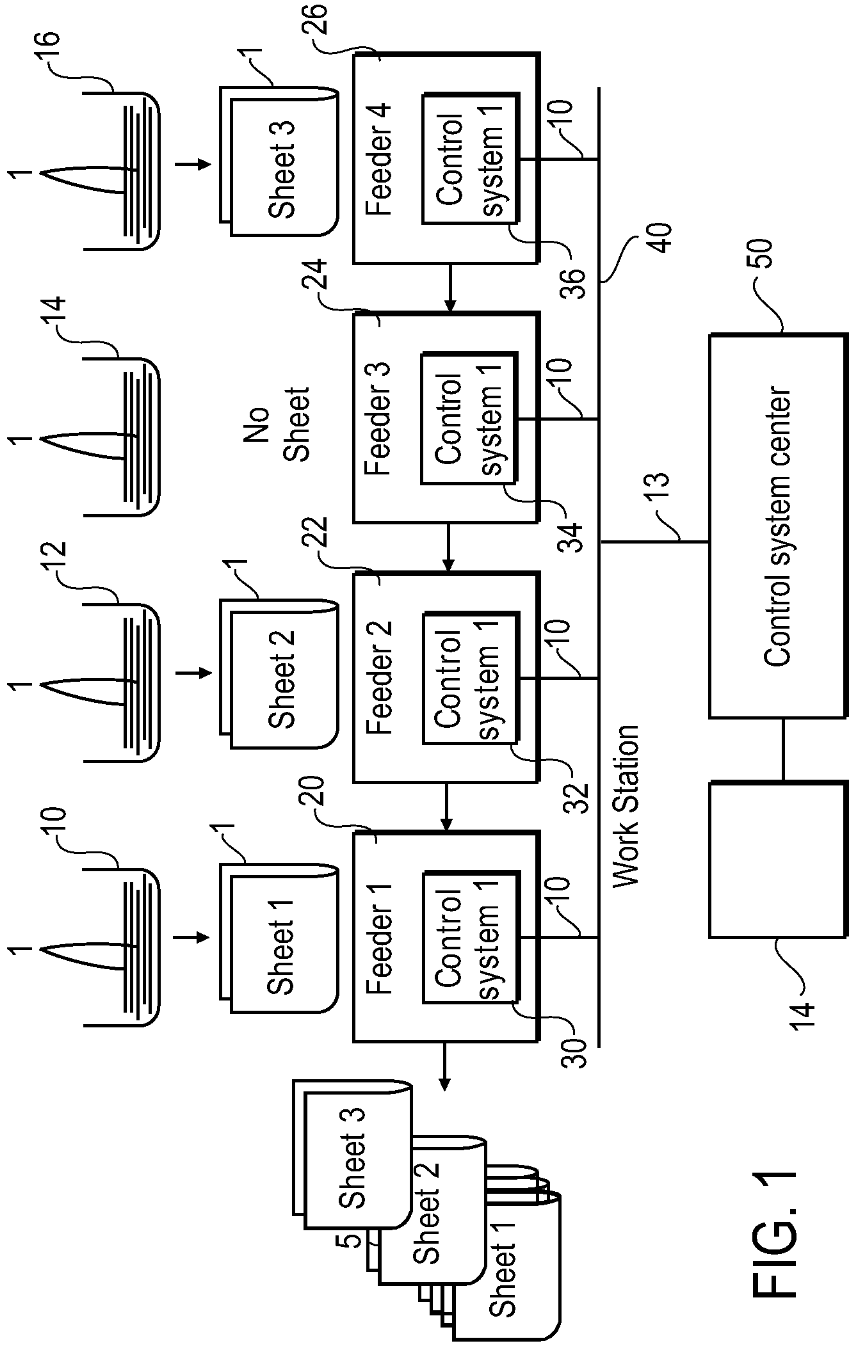
FIG. 1 shows a schematic representation of an inventive device suitable for execution of inventive methods.

The device presented in FIG. 1 comprises a total of four printed sheet magazines 10, 12, 14 and 16, from which individual printed sheets 1 may be removed by feeders 20, 22, 24 and 26 and may be fed to a working station.

Figure 2:
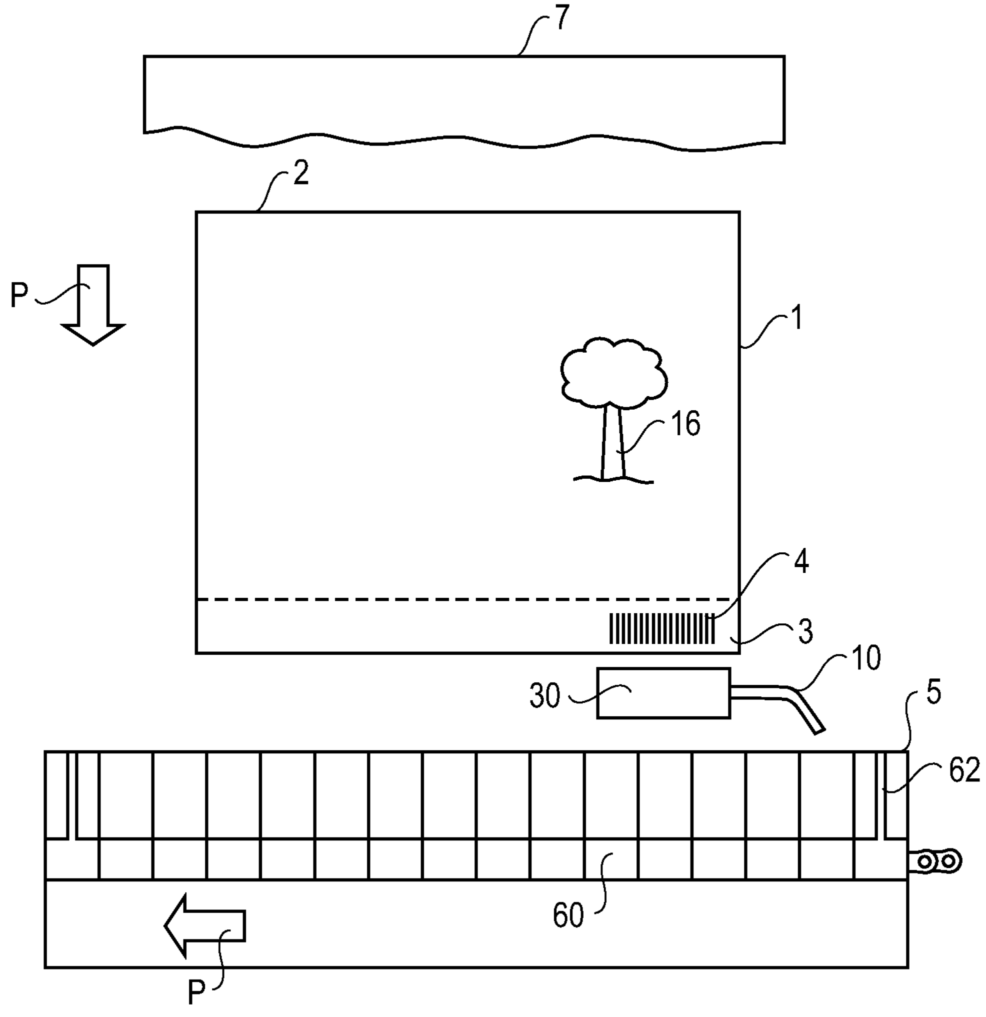
FIG. 2 shows a detailed presentation of the device shown in FIG. 1

As shown in FIG. 2, working stations of the device shown in FIG. 1 are realized as individual sections of a conveyor belt 60 on which the printed sheets which are removed from magazine 10 to 16 by feeding devices designed as printed sheet feeders are opened and are deposited astride. Printed sheets 1 are deposited each in the direction of the arrow P on running conveyor chain 60 and are carried further in direction of the arrow P', whereby, with the aid of subsequent feeders, additional printed sheets may be deposited on the sheet first deposited on conveyor chain 60. From printed sheets gathered in such a manner at the working stations, a magazine brochure or a book is produced during the course of subsequent processing.

According to FIG. 1, registration devices 30, 32, 34 and 36 are assigned to individual feeders 20, 22, 24 and 26 which can capture composition information provided by the printed sheets to be fed by said feeders. In the embodiment illustrated in FIGS. 1 and 2, the composition information is printed in form of a bar code 4 on a bleed 3 of the individual printed sheets and is captured by registration devices in form of bar code readers 30 to 34. Data corresponding to bar codes 4 are transferred via an appropriate data acquisition system together with the corresponding position information of the feeder, to a control device in form of a central control device 50, illustrated by the embodiment shown in FIGS. 1 and 2. In control device 50, composition information and position information are analyzed by comparing the composition information embedded in individual sheets removed from magazines 10 to 16, to determine, whether it is possible to produce a product in conformance with predetermined criteria. The following definitions are used to illustrate the composition information:

TABLE 1

| | |
|---|---|
| Sheet, printed sheet | Smallest, not assembled element of a product |
| Sub-sheet S | Instead of a single, individual printed sheet in a product, there is a small number of different sub-sheets. At a maximum, one of the sub-sheets may be present in a product. |
| Product P | A desired composition of printed sheets constitutes a product (=book or booklet) |
| Order A | An order represents the totality of all desired products, produced from the entirety of all printed sheets |
| Sheet address A.P.S | Each printed sheet has an address which says to which order and to which product it belongs and which sub-sheet number it carries |
| Address segment | A, P and S are the 3 address segments in the sheet address |
| Special functions F | Special properties of individual sheets or a product with respect to topological properties |
| Link left x | Link to neighbor sheet left (x points to the predecessor) |
| Link right y | Link to neighbor sheet right (y points to successor) |
| Encoding mode M | M refers to the selected encoding method, which translates the topology properties of a sheet into a number |
| Code value W | Integer taken from the range of values (e.g. 0 . . . 99 99 99 99), which is assigned to a sheet by an encoding method M |

As shown in Table 1, the product information may comprise three address segments A, P and S, whereby for each of said address segments there may be a placeholder "*" or "0", which indicates that this address segment may present any value. This leads to combination possibilities of product information from individual address segments, as summarized in Table 2.

TABLE 2

| | |
|---|---|
| *.*.* | Global sheet, it may be used in every order (very rare, at best may apply for an advertisement sheet) |
| A.*.* | Sheet, that is used in more than one product of the order |
| A.P.* | General case: the sheet is used only once for a single product |
| A.P.S | Sub-sheet, that may be used in exactly one product, but not necessarily has to. |
| A.*.S | Sub-sheet that may be present in multiple products |
| *.P.S | Sub-sheet that may be present in a single product and also in other orders (very rare case) |
| *.P.* | Sheet that must be present in various orders in product P |

Figure 3:
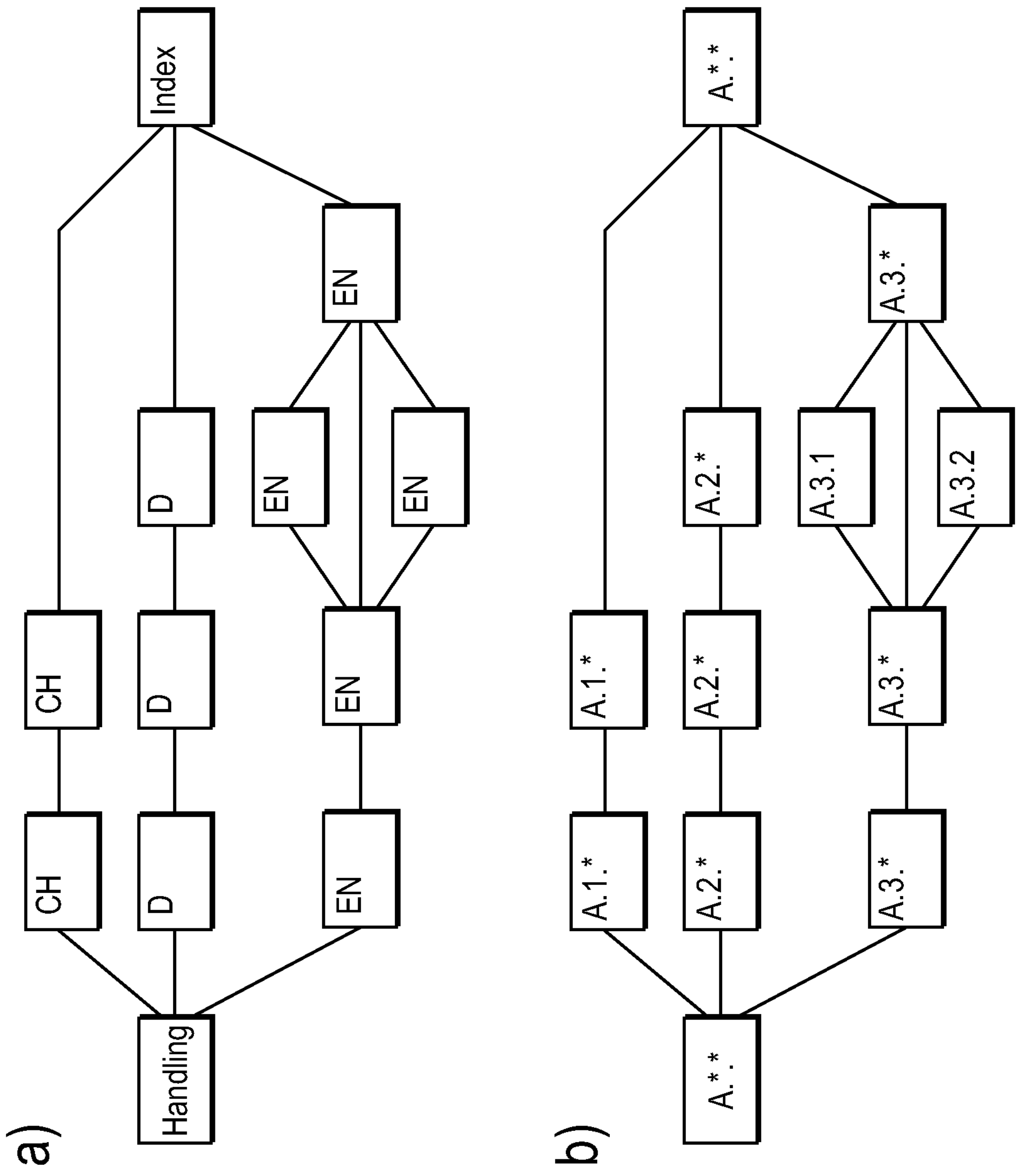
FIG. 3 shows a schematic representation of a first embodiment of the inventive methods.

With the so-structured product information, different products of a common product series or a joint order may be designated, as shown in FIG. 3.

According to FIG. 3*a*), five different product types, which are part of a single order, shall be produced. The products may, for example, consist of catalogs. All product types feature a common cover page and a common index. The first product type is intended for distribution in Switzerland and contains the corresponding printed sheets. The second product type is intended for distribution in Germany and contains the corresponding printed sheets. The third product type is intended for distribution in English-speaking countries and contains a first sub-sheet. The fourth product type is also intended for distribution in English-speaking countries and does not contain a sub-sheet. The fifth product type is intended for distribution in English-speaking countries and contains a second sub-sheet. A suitable structure of the product information for these product types is shown in FIG. 3*b*). Accordingly, all printed sheets of this product type feature an address segment A indicating said order. The printed sheets of the first product type feature an address segment "1" indicating said product type. The printed sheets of the second product type feature an address segment "2" indicating said product type and the printed sheets of the third to fifth product type feature a common address segment "3". Through product information "A.*.*" for cover page and index, it is indicated, that these sheets may be used for all product types.

The abovementioned product information does not contain information with respect to sequence and number of sheets in a product. It is only possible to determine whether a sheet may be present in a product or not. The position information determining the sequence of the sheets in a product may be indicated according to the "domino principle" and may represent the topology of the products. Just as in a game of domino, a sheet with a position information indicated by the number pair (x,y) is preceded by a sheet with a position information indicated by the number pair ("*,x) and a following sheet with a position information indicated by the number pair ("y.*"). Individual rules may apply for the first and the last sheet, as can be seen in the following table.

TABLE 3

| | |
|---|---|
| 0 | Joker, any value allowed on the other side |
| 97 | The sheet may, but doesn't have to be at the beginning (only for x-left) |
| 98 | The sheet may, but doesn't have to be at the end (only for y-left) |

TABLE 3-continued

| | |
|---|---|
| 99 | End of the link, the sheet has to be at the beginning or end |
| 90 . . . 92 | 1, 2 or >=3 sheets without barcode follow inside the product |
| 93 . . . 95 | 1, 2 or >=3 sheets without barcode are at the beginning or end of the product |

Figure 4:
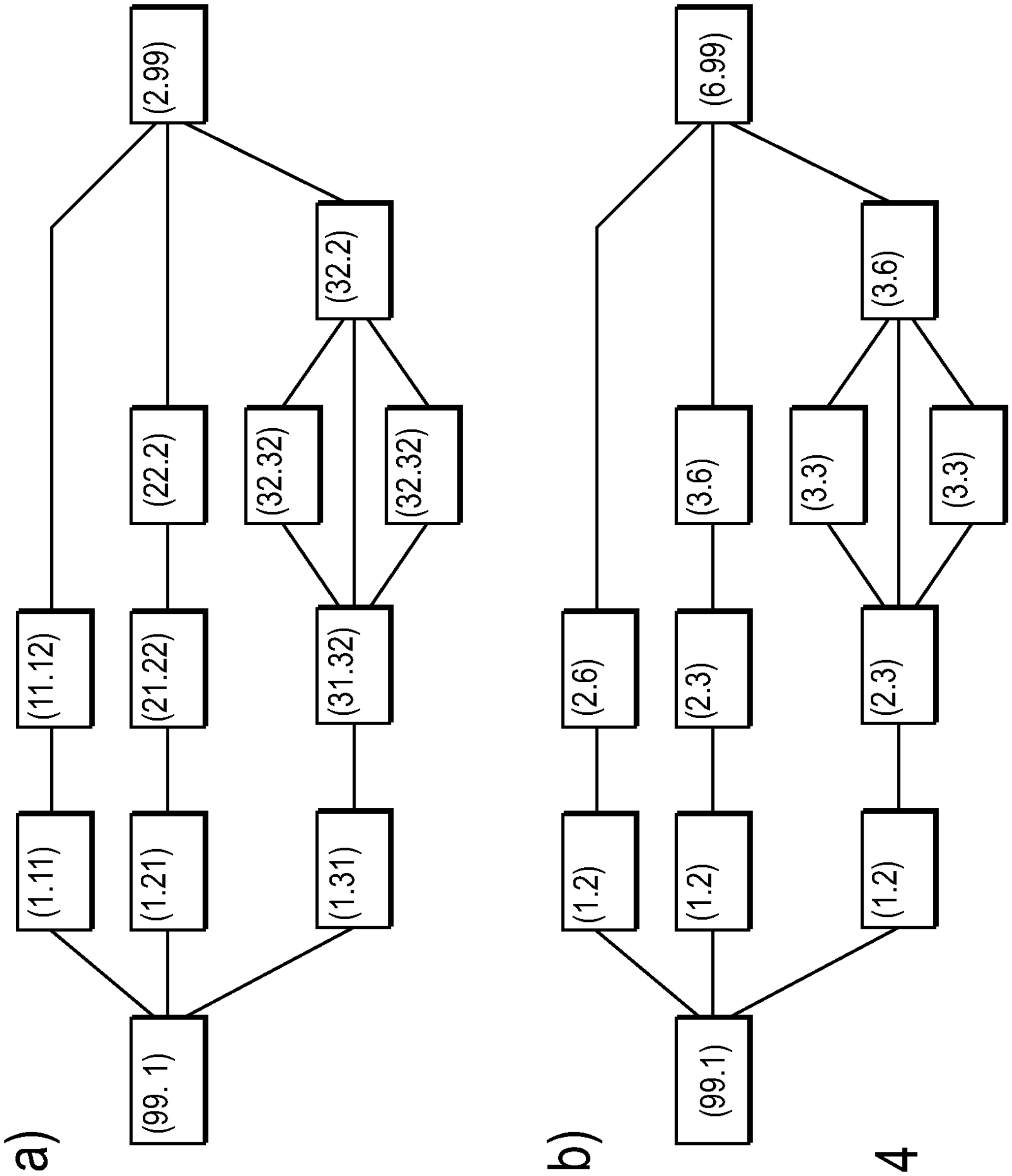
FIG. 4 shows a schematic representation of a second embodiment of the inventive methods.

For a product composition as shown in FIG. 3, the individual printed sheets may then have the position information shown in FIG. 4*a* as possible position information. Also possible is partially identical position information, if the sheets may be distinguished by product information, as illustrated in FIG. 4*b*). With respect to position information it should be noted:

When both links of the position information on a sheet assume the same value, then said sheet is optional. This may be defined during set-up of the device used for executing the method.

A link with value 0 is compatible with any other link on the other side. Thus, a sheet with the position information "0.0" may be positioned at any place within a product. When the inventive method is executed in such a manner, that the composition information is only compared to information derived from at least one more printed sheet used for producing said printed products when producing the first printed product of a series of identical products, only during the "reference phase", that is during set-up of the machine, a sheet with position information "0.0" may be placed anywhere. During the subsequent production, it may only be gathered as specified during set-up in the reference phase.

The composition information embedded in individual sheets may contain in addition to product information and position information also one or more additional types of information, which feature particular properties of the sheet itself or of the feeding device used for processing said sheet. These additional types of information may be included in the composition information using the following values:

TABLE 4

| Special function F | Description |
|---|---|
| 0 | No special function available (default value) |
| 1 | Symmetrical sheet, may also be inserted twisted |
| 2, 3, 4, 5 | The same sheet is used 2 . . . 5 times consecutively |
| 6 | Coming and Going Product: First and last sheet are identical, but inserted rotated by 180°, also the second and the second to last, . . . etc. |
| 7 | Link x of the sheets in the stack are variably linked with the subsequent sheets |
| 8 | Link y of the sheets in the stack are variably linked with the preceding sheets |
| 9 | Link x of these sheets is constant, but the subsequent sheets stem from a stack with a variable link y |
| 10 | Link y of these sheets is constant, but the preceding sheets stem from a stack with a variable link x |

An advantage of the inventive methods over conventional methods for production of printed products such as newspapers, magazines or books may be seen in that control of the production process is possible without the necessity to have additional information from the outside such as information regarding product topology or product composition. A control of printed products may take place just once, that is, when setting up the machine. When using special function F, as shown Table 4, these are the special functions up to 6. Using special functions 7 to 10, the production process may be extended to include dynamically controlled product compositions. Therefore, these special functions allow the production of several different products in one production cycle by one machine. This is particularly beneficial when some extent, in addition to a variable sheets, also identical sheets may be present in different products. Thus, simple "selective binding" without an elaborate "selective binding controller" is made possible.

Figure 5:
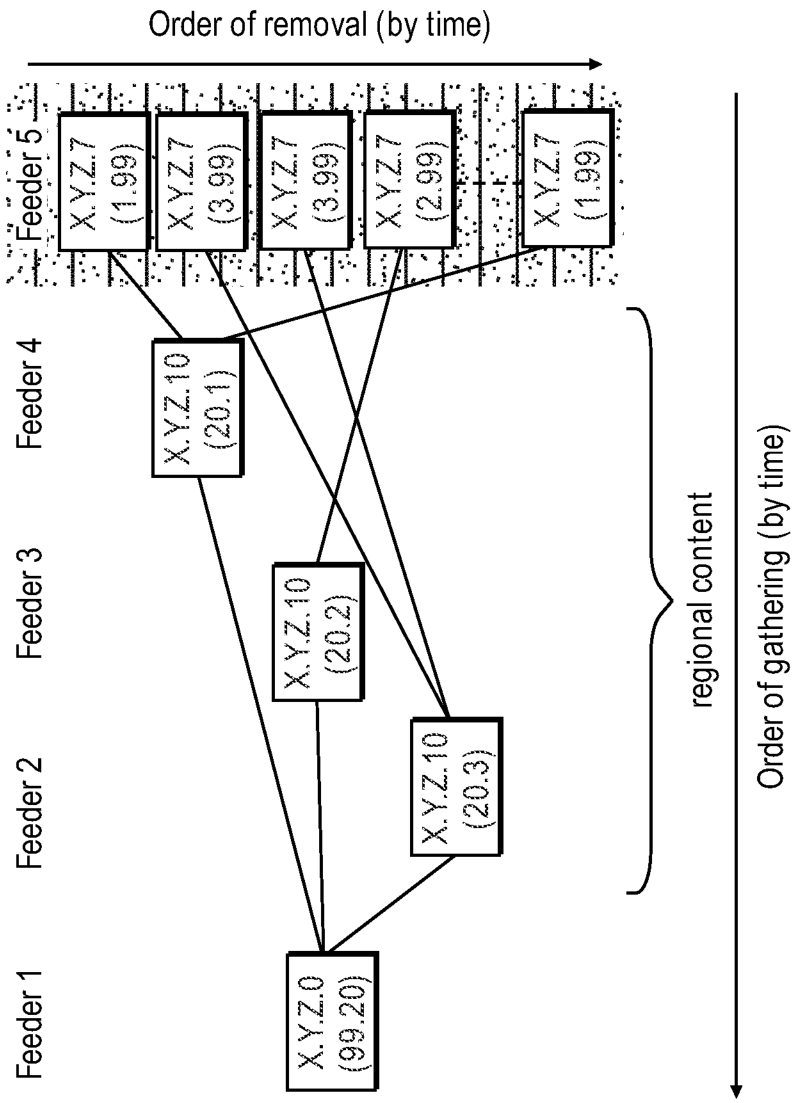
FIG. 5 shows a schematic representation of a third embodiment of the inventive methods.

Said variable production, made possible by special function value 7, is described in FIG. 5. The first sheet of the products which is fed by feeder 5 shall include the residential address to which the product is sent. According to FIG. 5, three national regions are being considered, and depending on the region where the respective recipient lives, a sheet containing the respective regional content shall be added to the printed product. For the first sheet removed with feeder 5 special function value 7 is permitted, whereas for the following sheets to be added by subsequent feeders 2 to 4 special function value 10 is permitted. Therefore, the method described in FIG. 5 produces three different products where the different sheets with the regional content are added with the aid of feeders 2 to 4, and for production of a printed product only one of said feeders 2 to 4 is actually used, whereas a sheet common to all printed products is added with the aid of feeder 1.

In a production process for the production of three printed products which are different in terms of their regional content, in a first process cycle for production of a first printed product a printed sheet with composition information X.Y.Z.7 (1.99) is removed with the aid of feeder 1 from a corresponding printed sheet stack and deposited on the conveyor chain. Then, a sheet with composition information X.Y.Z.10 (20.1) is removed with the aid of feeder 4 from a corresponding printed sheet stack, and deposited on the conveyor chain. Finally, a sheet common to all products with composition information X.Y.Z.0 (99.20) is removed with the aid of feeder 4 from a corresponding printed sheet stack to complete the first printed product, and deposited on the conveyor chain.

In the second and third process cycle for production of the second and third printed products, a printed sheet with composition information X.Y.Z.7 (3.99) is removed with the aid of feeder 5 from a corresponding printed sheet stack and deposited on the conveyor chain. Then, the printed sheet common to the second and third product or the regional sheet with composition information X.Y.Z.10 (20.3) is removed with the aid of feeder 2, and deposited on the conveyor chain. The second and third printed product of the printed product series is then completed by the sheet that is common to all products with composition information X.Y.Z.0 (99.20), which is removed by feeder 1, and deposited on the conveyor chain.

For the fourth product of the printed product series, a printed sheet with composition information X.Y.Z.7 (2.99) is removed with the aid of feeder 5 from a corresponding printed sheet stack, and deposited on the conveyor chain.

With the aid of feeder 3, a printed sheet with composition information X.Y.Z.10 (20.2) is added to said printed sheet. This is done by feeder 3. Finally, a sheet common to all products with composition information X.Y.Z.0 (99.20) is removed with the aid of feeder 1 from a corresponding printed sheet stack to complete the first printed product, and deposited on the conveyor chain.

In this manner, a total of three different printed products differing with respect to the regional and address information are produced with feeders 1 to 5.

With the aid of special functions shown in Table 4 and presented by corresponding partial information of the composition information, sheets may be labeled which consist at least in part of basically identical sheets, however, in different languages.

In this case, linguistically mixed sheet stacks may be used at the feeder at which the first language-dependent sheet is to be fed. With the aid of a special function value, which allows for variable product information of the corresponding feeder, this may be realized according to the production process described in FIG. 5. This special function is not included in Table 4. Furthermore, when using the special functions listed in Table 4, a product may also take a different transport path, depending on the value for one or more components of the composition information. In the example of the embodiment described in FIG. 5, the product flow may be operated for two weeks in a manner such that products used in various regions are transferred outward by different routes.

As already explained above, the assembly information embedded in the printed sheet may be coded by a predetermined encoding method. For production of different products with complex product compositions, it has proved advantageous in order to keep the code as short as possible to apply, in accordance with the present invention, composition information encoded with different encoding methods. For processing of said composition information, it has proved advantageous, when said composition information contains partial information indicating the encoding method and the inspective device is performing the decoding according to said partial information.

With an encoding method, a numerical value W may be generated:

$W=W(M,A,P,S,F,x,y)\approx M.A.P.S.F.x.y$ (only symbolic notation)

For each encoding method, different ranges may be used for the individual components. It is also conceivable that new components are added or individual components are completely omitted and are replaced by a predetermined place holder. Said placeholder may be "0" or another placeholder value, which is not being used in any other encoding method M. In the following table, examples of different encoding methods are displayed. Here, components not being used are defined by "-" and by placeholder values, which are shown in parentheses:

TABLE 5

| | Mode | | | | |
|---|---|---|---|---|---|
| | 1 | 2 | 3 | 4 | 5 |
| Number of digits | 8 | 8 | 8 | 8 | 10 |
| Value range A | 0 . . . 9 | — (−1) | 0 . . . 9 | 0 . . . 99 | 0 . . . 99 |
| Value range P | 0 . . . 9 | 0 . . . 999 | 0 . . . 99 | 0 . . . 9 | 0 . . . 9 |
| Value range S | 0 . . . 9 | — (0) | — (0) | — (0) | — (0) |
| Value range F | — (0) | — (0) | — (0) | — (0) | 0 . . . 99 |
| Value range x | 0 . . . 99 | 0 . . . 99 | 0 . . . 99 | 0 . . . 99 | 0 . . . 99 |
| Value range y | 0 . . . 99 | 0 . . . 99 | 0 . . . 99 | 0 . . . 99 | 0 . . . 99 |

For example, encoding method 1 (Mode 1) is described here. In this encoding method, the composition information comprises a total of eight digits. The first digit indicates the order, of which the product to be produced is a part of, and may have a value from 0 to 9. The second digit indicates the product type to be produced with the respective printed sheet, and may have a value from 0 to 9. The third digit indicates the properties of the sheet as sub-sheet, i.e. as optional sheet of the product indicated by the third digit and may also have a value in the range from 0 to 9. The fifth digit defines a special function which this sheet may adopt in this product. In encoding method 1, this special function value is not taken and a placeholder value "0" is used. The fifth and sixth digits define the range of values for the linking part of the position information. Said linking information may be selected from the range of values 0 to 99. The seventh and eighth digit then defines the linking information y of the position information. Said linking segment y may also adopt a value 0 to 99.

When using the different encoding methods, it should be noted that for each sheet of a product, the encoding method may be selected independent of the encoding method of the remaining products. Of the encoding methods described in Table 5, encoding method 2 (M=2) is not compatible with the other encoding methods if in said other encoding methods the value of A is not set equal to 0.

Figure 6:
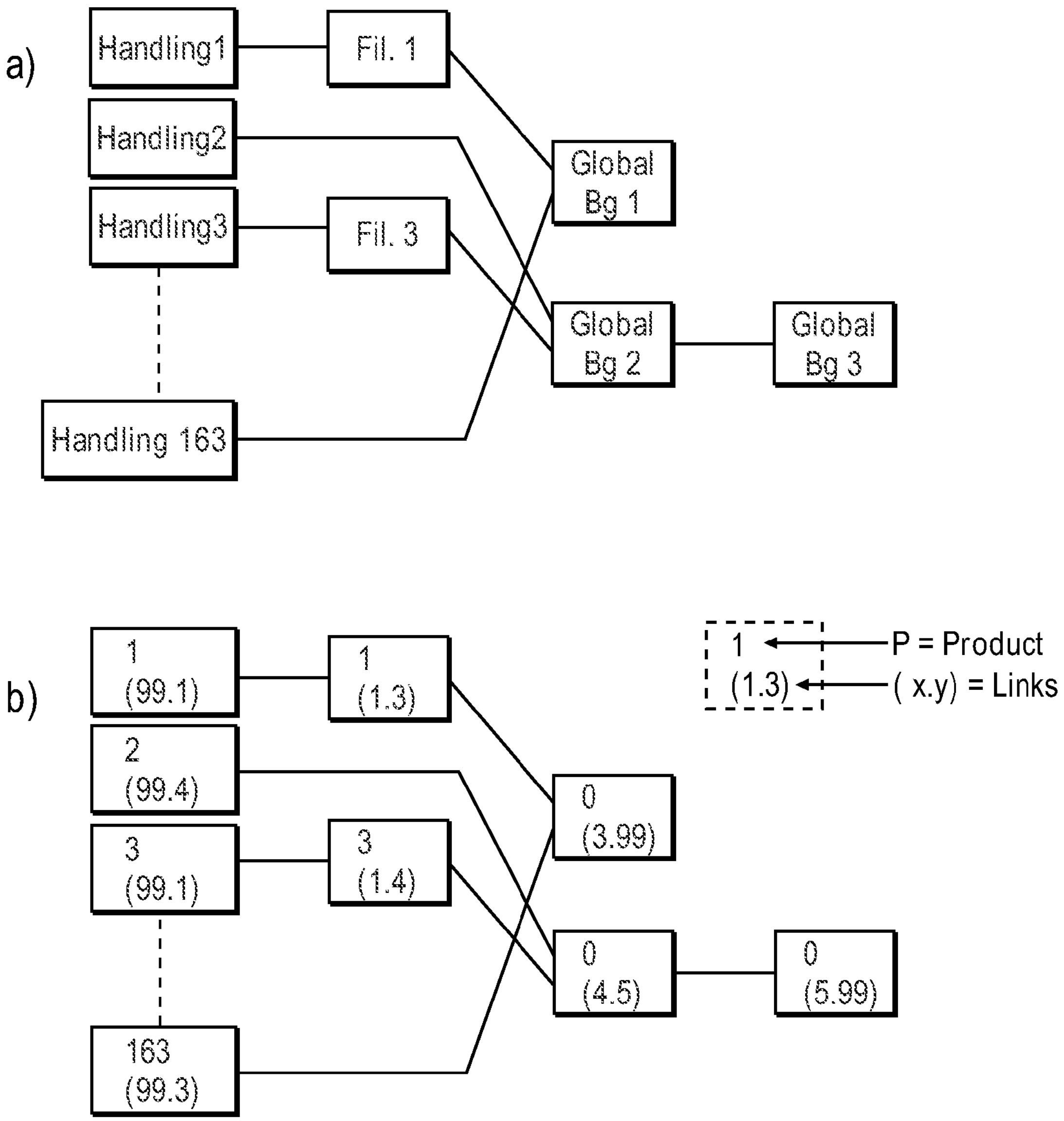
FIG. 6 shows a schematic representation of a fourth embodiment of the inventive methods.

FIG. 6 describes another embodiment of the present invention. This embodiment relates to a bank with 163 branches that would like to send a magazine regularly to its customers. Each branch has its own design of the magazine, with at least the cover being branch-specific. Larger branches may additionally use one or two of their own sheets, to which at maximum two more general sheets may be added. A general description of the composition of the respective magazine is displayed in FIG. 6*a*). For this job, encoding method N=2 is well suited, in which the position information consists only of the product number which, in this case, may be the branch number. The linking via the position information is shown in FIG. 6*b*). To ensure that old sheets from previous editions are identified as wrong, the link numbers x and y may be increased by 5 in every new order.

Figure 7:
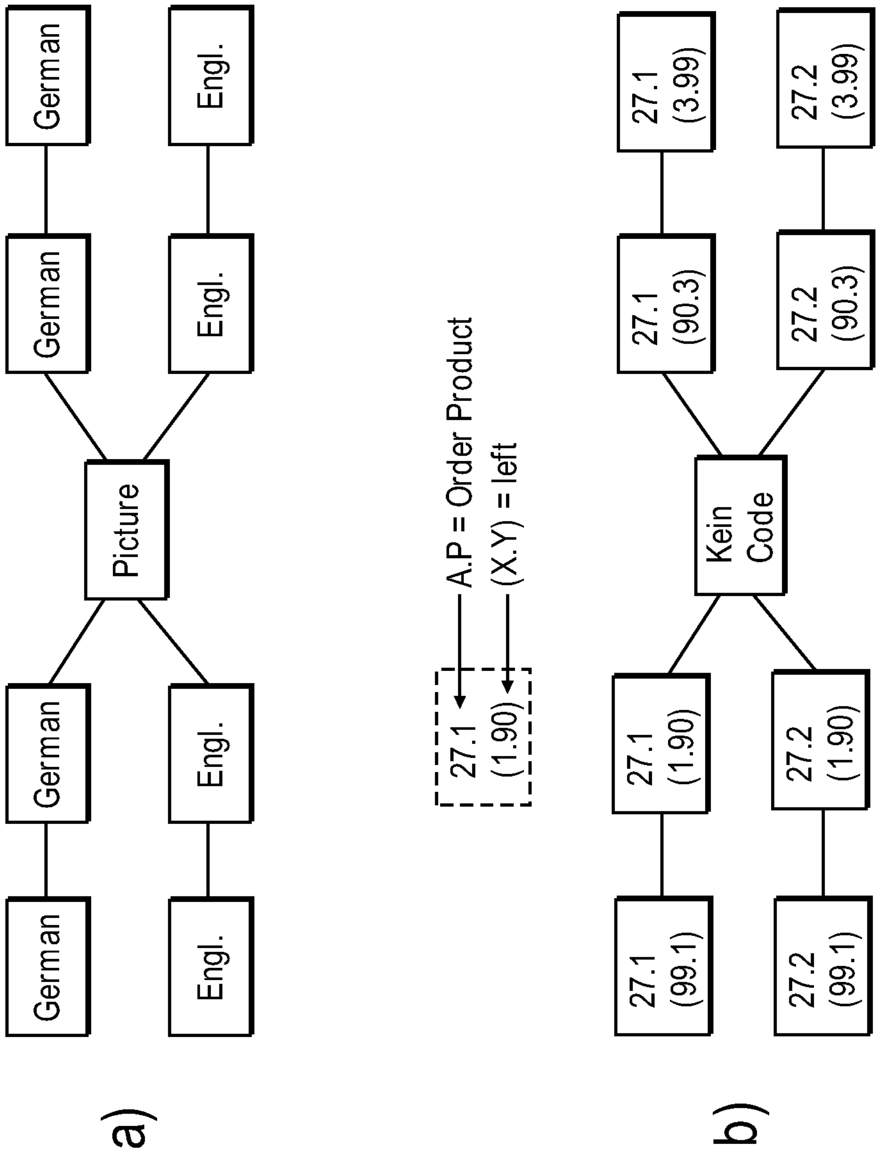
FIG. 7 shows a schematic representation of a fifth embodiment of the inventive methods.

FIG. 7 describes yet another embodiment of the present invention. This embodiment relates to publishing a book as both, a German and as an English edition. Inside the book, there is a specifically-printed sheet with high-quality images for both editions. However, this sheet does not contain any composition information. The composition of the corresponding products is shown schematically in FIG. 7*c*). In this case, any encoding method may be used, however, encoding method 4 (M=4) would be a good choice because then, this order may be distinguished from many other orders.

The respective encodings for each sheet are shown in FIG. 7*b*).

Finally, it is noted, that position information is typically included in the form of bar codes, that can be read by a bar code reader.

The invention claimed is:

1. A method for producing printed products wherein said printed products are composed of printed sheets that are fed sequentially to a working station and for verification of the composition, composition information on at least one printed sheet characterizing said printed sheet with respect to predetermined printed sheet properties is evaluated, wherein the composition information of at least one printed sheet contains position information consisting of two partial informations, the first partial information either describing printed sheets which may be fed to the working station before feeding said printed sheet or describing that no printed sheet is to be fed before, the second partial information either describing printed sheets which may be fed to said working station after feeding said printed sheet or describing that no printed sheet is to be fed afterwards, whereby the position information of at least two of the printed sheets to be fed sequentially to the working station are compared to each other during the analysis.

2. A method according to claim 1, characterized in that an error signal is generated, when during the analysis it is found that the composition of the printed product is faulty.

3. A method according to claim 2, wherein:

the composition information contains product information indicating that a printed sheet belongs to one or more printed products; and the error signal is generated when analysis of the product information of two printed sheets, which are to be assembled to one printed product, shows that the printed sheets may not be assembled to one printed product.

4. A method according to claim 1, characterized in that the composition information of at least one printed sheet is compared only during production of the first printed product of a product series to information derived from at least one more printed sheet used for said production of said printed products.

5. A method according to claim 4, characterized in that the composition information of at least one printed sheet during production of the following product of the production series is compared to the composition information of the printed sheet used for the first printed product of the production series.

6. A method according to claim 1, characterized in that the composition information of at least one printed sheet during production of each printed product of the production series is compared to the information derived of at least one more of said printed sheets used for said production of said printed product.

7. A method according to claim 1, characterized in that the working station is transported along a production path during composition of printed products and printed sheets are fed with feeding devices positioned along the production path.

8. A method according to claim 7, characterized in that printed sheets for two or more printed products are fed with at least one feeding device.

9. A method according to claim 8, characterized in that the composition information of the fed printed sheets fed by the feeding device designed for feeding two or more printed products contains partial information, and after evaluation of said partial information, the generation of an error signal is prevented when printed sheets with composition information differing from each other are fed by said feeding device.

10. A method according to claim 1, characterized in that during composition of the printed sheets, at least one printed sheet is selected based on the evaluation of the composition information provided by at least one more printed sheet.

11. A method according to claim 8, characterized in that the composition information of a printed sheet contains beginning and end information which indicates that during production of said printed product before or after feeding of said printed sheet no other printed sheet is to be added, and said error signal is generated when a sheet is fed to a preceding or following feeding device positioned along the production path serving to feed said printed sheets containing said end information.

12. A method according to claim 8, characterized in that at least at one feeding device the composition information contained on the printed sheet to be fed with said feeding device is captured and transferred to an inspective device.

13. A method according to claim 12, characterized in that the composition information is coded according to a predetermined encoding method and is decoded in the inspective device.

14. A method according to claim 13, characterized in that the composition information contains a partial information indicating the encoding method and the inspective device is decoded according to said partial information.

15. A method according to claim 1, characterized in that for composition of printed products, printed sheets without composition information may be fed, said feeding is indicated by composition information contained on at least one printed sheet.

16. The device to execute a method according to claim 1, with a plurality of feeding devices designed for feeding printed products to a working station, whereby at least two feeding devices are assigned a registration device for registering composition information embedded in the printed sheets to be fed by said feeding machine and an inspective device designed for evaluation of the composition information captured by said registration device which is configured to compare composition information of at least two registration devices, the composition information containing position information consisting of two partial informations.

* * * * *